Jan. 7, 1930.　　　　　F. J. ROOT　　　　　1,742,668
MAGAZINE TYPE DISPENSER
Filed July 3, 1923　　　7 Sheets-Sheet 1

Inventor
Frederick J. Root
By Frank D. Gray
Atty

Jan. 7, 1930.  F. J. ROOT  1,742,668
MAGAZINE TYPE DISPENSER
Filed July 3, 1923   7 Sheets-Sheet 2
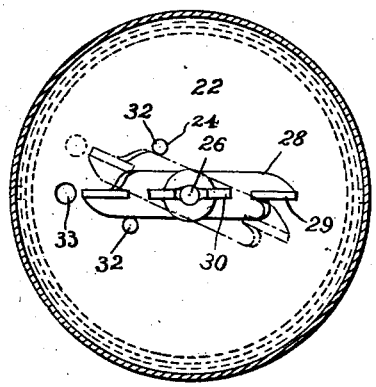
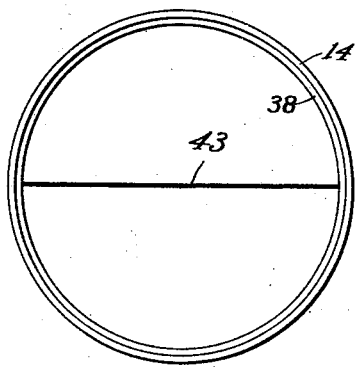
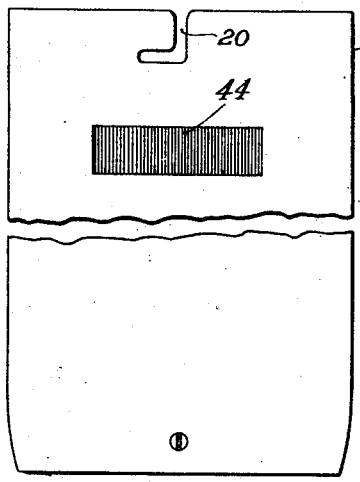
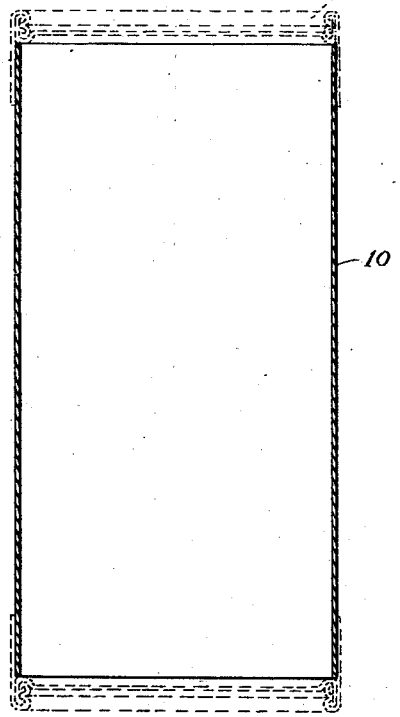
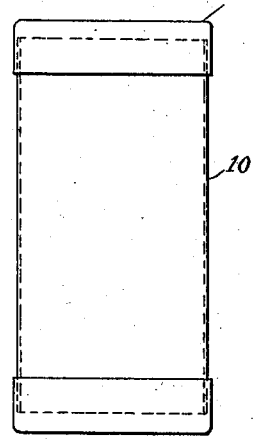
Inventor
Frederick J. Root
By Frank D. Gray
Att'y Jan. 7, 1930. F. J. ROOT 1,742,668
MAGAZINE TYPE DISPENSER
Filed July 3, 1923   7 Sheets-Sheet 3

Inventor
Frederick J. Root
By Frank D. Gray
Atty.

Jan. 7, 1930.  F. J. ROOT  1,742,668
MAGAZINE TYPE DISPENSER
Filed July 3, 1923   7 Sheets-Sheet 4

Inventor
Frederick J. Root
By Frank D. Gray
Atty

Jan. 7, 1930. F. J. ROOT 1,742,668
MAGAZINE TYPE DISPENSER
Filed July 3, 1923 7 Sheets-Sheet 5
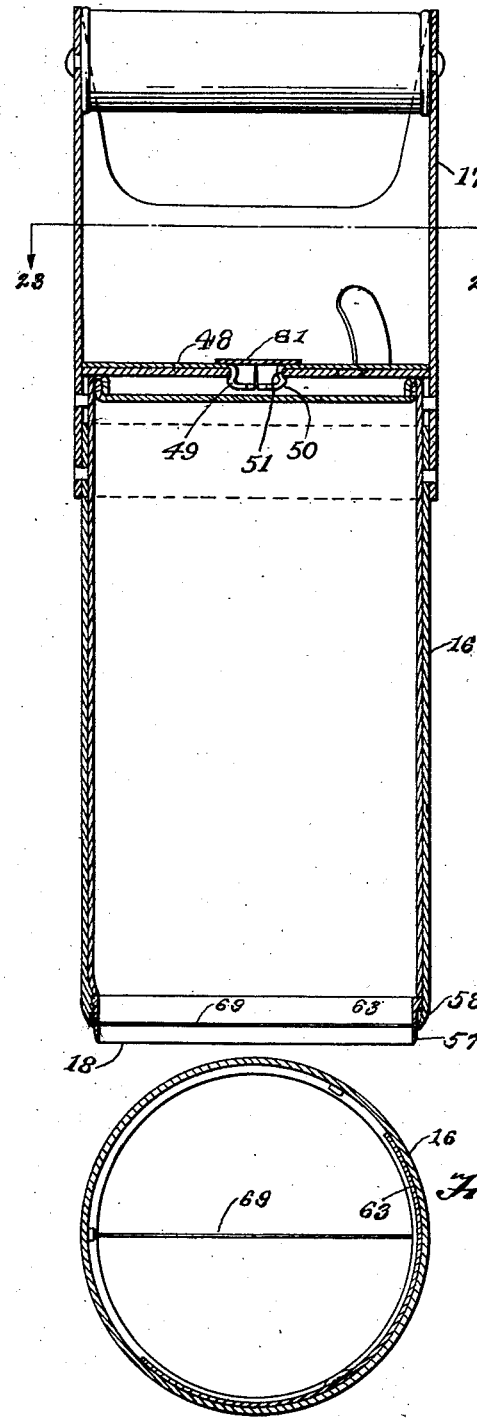
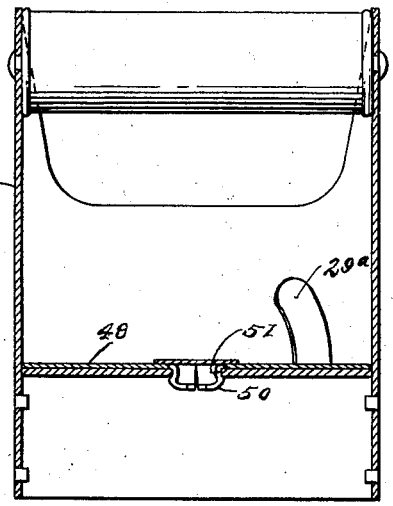
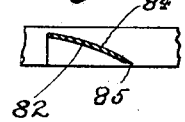
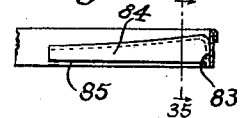
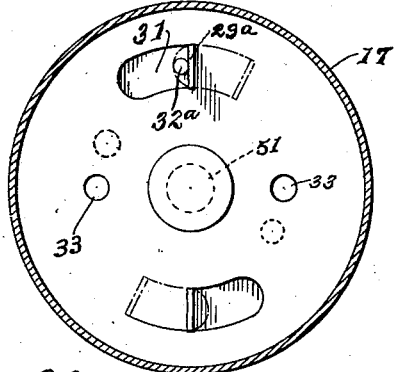
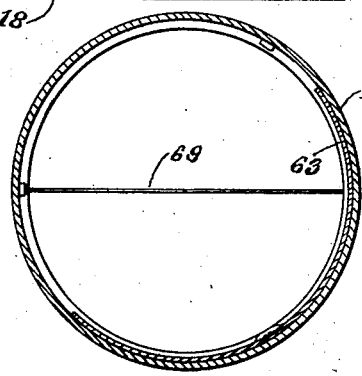
Inventor
Frederick J. Root.
By Frank D. Gray
Att'y Jan. 7, 1930.　　　　F. J. ROOT　　　　1,742,668
MAGAZINE TYPE DISPENSER
Filed July 3, 1923　　　7 Sheets-Sheet 6
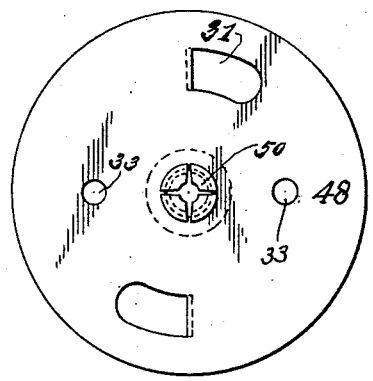
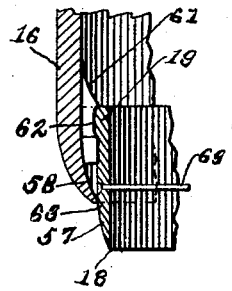
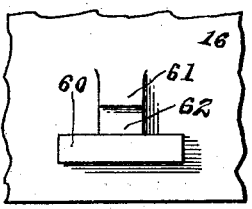
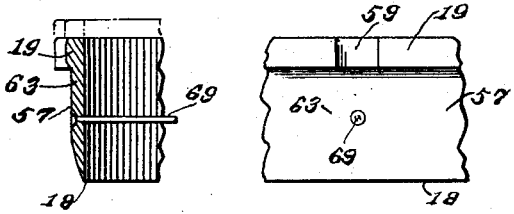
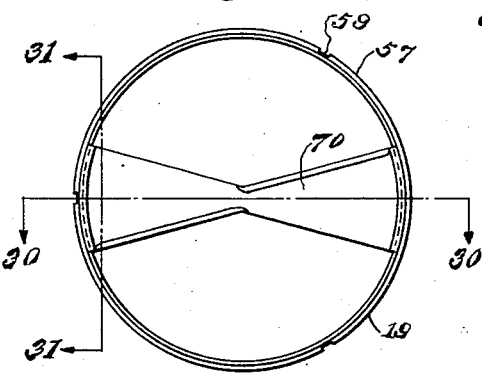
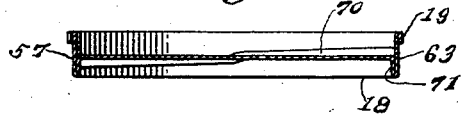
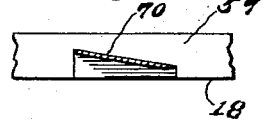
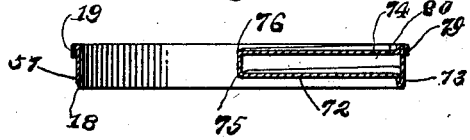
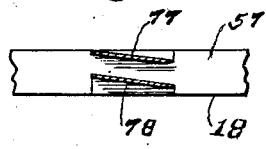
Inventor
Frederick J. Root,
By Frank D. Gray
Atty.

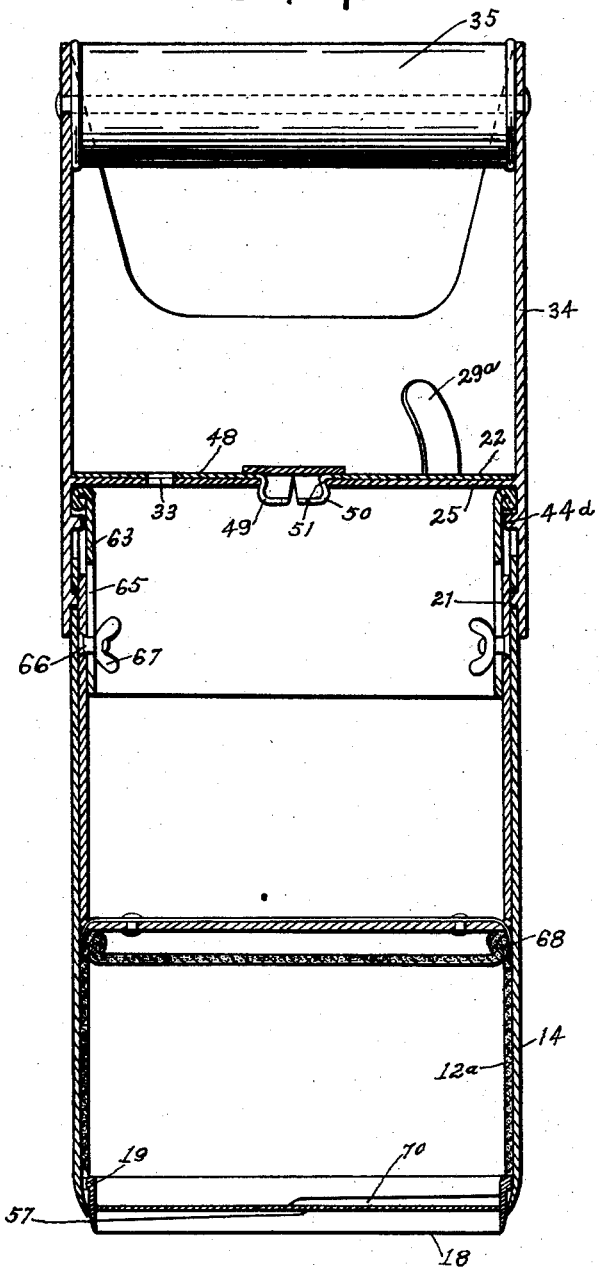

Patented Jan. 7, 1930

1,742,668

UNITED STATES PATENT OFFICE

FREDERICK J. ROOT, OF CLEVELAND, OHIO

MAGAZINE-TYPE DISPENSER

Application filed July 3, 1923. Serial No. 649,241.

My invention relates to magazine-type dispensers for plastic products such as ice cream, lard, peanut butter or cottage cheese, and is especially directed to magazines which receive therein cartons to be protected thereby, while the two are forced into a mass of material to be dispensed, for filling purposes.

It is a particular object of my invention to provide an open end magazine which has imperforate side walls for protecting therein the carton to be filled, and a handle member detachably connected with the magazine for normally closing one end of the latter when assembled, and by which the magazine and carton may be carried while forcing the latter down into the material, thus permitting of the removal of the filled carton through the upper end of the magazine after the handle part has been disengaged. This is regarded as a decided advantage, since the bottom edge of the magazine will of course be in a dripping condition when lifted from the supply source of material.

It is a special object of my structure to provide for relieving the contents of the carton being filled of any excess pressure whatever caused by plunging the magazine into the source of supply. The latter operation has always tended, when plunger dispensers were used, in the past, to pack the material into the carton under so great pressure that its density was greatly increased, and as a result, the dealer suffered loss by overfilling. It is my purpose to relieve this internal pressure, and thereby the resulting loss from increased density of the product, by the provision of vent apertures for escape of the air in the carton, while the plunging operation takes place, at the same time affording means for closing such apertures at will to hold the material therein while lifting the filled magazine from the mass. This latter provision is especially essential when the material is softer than its normal condition, as otherwise atmospheric pressure on the upper end of the material in the carton will tend to drop the same back in the supply again when the magazine is lifted.

It is a further object of my improvement to provide a magazine dispenser that is adapted to loading the carton at the upper or exposed end of the magazine and likewise withdraw the cartons at that end, and also a dispenser that may be used equally well with several types of cartons, each sold on the open market, but having certain differences in manufacture such as slight differences in height for a given volume of content, and different shape of closure for the ends. I also attain, by my detachable handle parts and magazine, the desirable result of fitting different sizes of magazines to the same size handle part. I also, by providing an intermediate element between the handle part and magazine proper, am able to fill a smaller size carton with the standard large size magazine.

Further, it is contemplated to make the before-mentioned intermediate element between the handle part and the main magazine of more than one section telescopically arranged to provide for adjustment therebetween, so that sizes of cartons may be filled by my structure that are intermediate that of the standard sizes of magazines which it is contemplated shall usually be carried in stock by dealers who will desire to use my dispenser for filling cartons.

A still further object of my improved dispenser is the provision of means which can be used for cartons of radically different type of manufacture, though all are of cylindrical form. I especially provide for filling open end cartons whose ends are to be covered by caps, for cartons having one permanently-closed end, the other open end being adapted to receive the usual cap, and cartons having one closed and one open end, there being one or more apertures in such closure for a purpose to be explained later.

To attain these and other objects of my new and improved device, I make use of the structure hereinafter described in the specification, recited in the appended claims, and illustrated in the accompanying drawings in which,—

Figure 5 is a transverse section of the handle member taken on the line 5—5 of Fig. 2;

Figure 6 is a plan view of the magazine cylinder;

Figure 7 is a side elevation of the magazine;

Figures 8 and 9 are longitudinal section and elevation views of a carton that may be used in my device;

Figures 20 and 21 are vertical sections of a modification;

Figure 22 is a transverse section through the magazine and carton of Fig. 20;

Figure 23 is a section on the line 23—23 of Fig. 20;

Figure 24 is a bottom plan of the rotor plate;

Figures 25 and 27 are sections, and Figs. 26 and 28 elevations of details of the locking means for the cutter;

Figure 29 is a plan of a blade cutter;

Figure 30 is a section on line 30—30 of Fig. 29;

Figure 31 is a section on line 31—31 of Fig. 29;

Figure 32 is a plan of another blade cutter;

Figures 33 and 34 are sections taken on lines 33—33 and 34—34 of Fig. 32;

Figure 35 is a cross section of the blade shown in Fig. 36, such section being taken on the line 35—35 of the latter view;

Figure 36 is a side elevation of a further modified form of blade cutter, and

Figure 19:
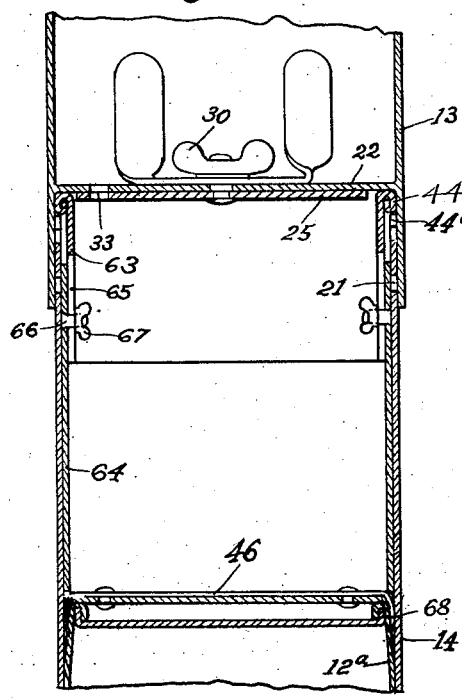
Figure 19 is a longitudinal section of combined handle, magazine and spacing members shown assembled and enclosing a carton below the spacer, the latter being of a sectional or compound form.
Figure 12:
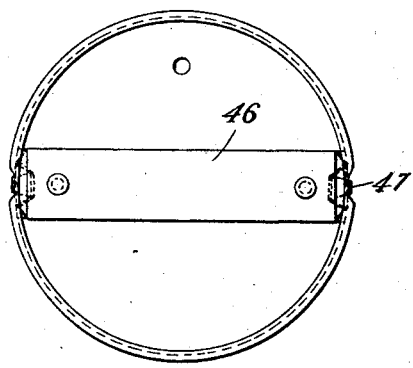
Figures 12 and 13 are plan and elevation views respectively, of a unitary form of spacing member.

Figure 37 is a central vertical section (the handle only being in elevation), of a combined structure of a complete device, showing the form of spacer in Fig. 19, the cutter of Fig. 30 and the vent shown in Fig. 20.

Figure 14:
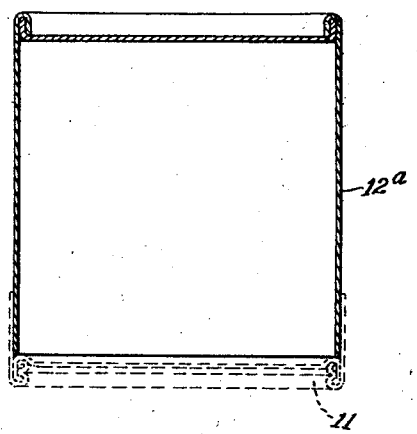
Figures 14 and 15 are longitudinal section and elevation views respectively, of a closed-end type carton which may be used in my device.
Figure 13:
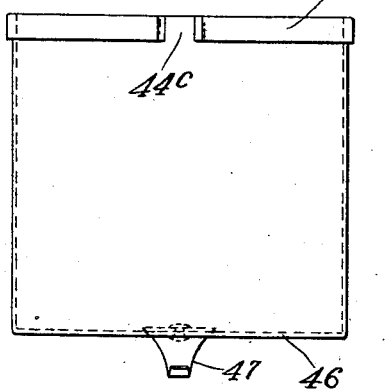
Figure 15:
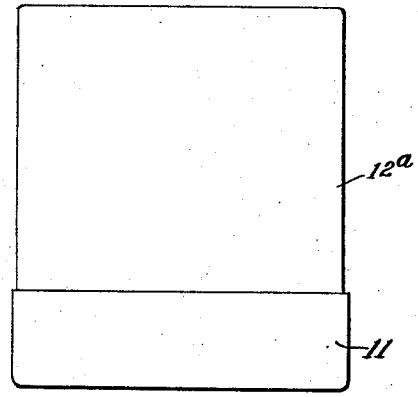

In the views the numeral 10 represents open ended cartons cylindrical in shape, having caps or covers 11 which are readily detachable and may be of the usual type, the particular form of structure thereof being immaterial to the merits of my invention. In Figs. 8 and 9 this type of carton is shown as a quart size, while in Figs. 14 and 15 the carton 12$^a$ is of the same diameter, but shortened to reduce the capacity to a pint, and having one closed and one open end.

My dispensing device comprises the metal handle part 13 adapted to be detachably connected at one end to the open-end cylinder 14. The two parts have means for locking engagement, comprising bayonet slots 20, shown in Fig. 7 as provided near the top edge of the magazine 14, and protuberances 21 on the inner surface of the part 13 for engagement with said slots. A transverse disc 22 is secured within the handle member 13 and spaced from the lower edges of the latter. The disc 22 has a central opening 23 therethrough, one or more apertures 24 therein, and pins 32 secured therein and serving as limiting pegs.

Below part 22 is arranged concentrically with the latter a disc 25 mounted upon the pivot bolt 26 and secured to it to rotate therewith. The bolt 26 has an angular portion 27 for actuation purposes. Actuating means for the bolt comprises a flat bar 28 having upstanding wings 29 for manual engagement and a central angular aperture for receiving therein the portion 27 of the bolt 26, the upper end of which is threaded to receive a wing nut 30 whereby 28 can be clamped upon the bolt.

Relative rotation between the parts 22 and 25 is provided by suitably spacing the pegs 32 which limit the relation of bar 28 in either direction. The two plates 22 and 25 have apertures 33 which are so positioned that they will register when the bar strikes one of these pegs but will be closed at other positions. Above the member 22 the handle member 13 comprises upstanding ears 34 mounting between them a suitable handle 35 secured to the ears by the bolt 36.

The magazine cylinder 14, shown in Figs. 1, 2, 7 and 10, has its lower edges tapered inwardly and ground exteriorly at 37 to provide a sharp cutting edge 39, and has an internal shoulder 38 spaced from said edge 39 a half inch or less. Between the edge and the shoulder the cylinder wall is apertured at diametrically opposite points each internally threaded at 40 to receive therein a flange nut 41 having a central aperture therein. Seated in said central aperture is a small rotor 41$^a$ receiving therethrough the end 42 of a cutting wire 43. The outer end of the wire is bent backwardly and secured in said rotor. Rotation of one of the nuts 41 upon the threaded surface will suitably tension the cutting element 43. The shoulder 38 is preferably as broad as the thickness of the carton wall to be positioned thereon.

The magazine member 14 is the proper diameter to receive the carton therein by close fit, and is of proper length to provide space for a carton having an internal capacity of one quart. The carton rests on the shoulder 38 and its upper edges extend above the member 14 for an appreciable distance for a purpose to be explained later. One or more shorter members 14 may be provided for the same handle to dispense accurately pints or fractional parts thereof. Somewhat below the bayonet joint thereon a roughened or corrugated surface 44 is provided for convenient manual engagement on the external surface of the cylinder. Any roughened surface may be used to serve the same purpose.

Figure 1:
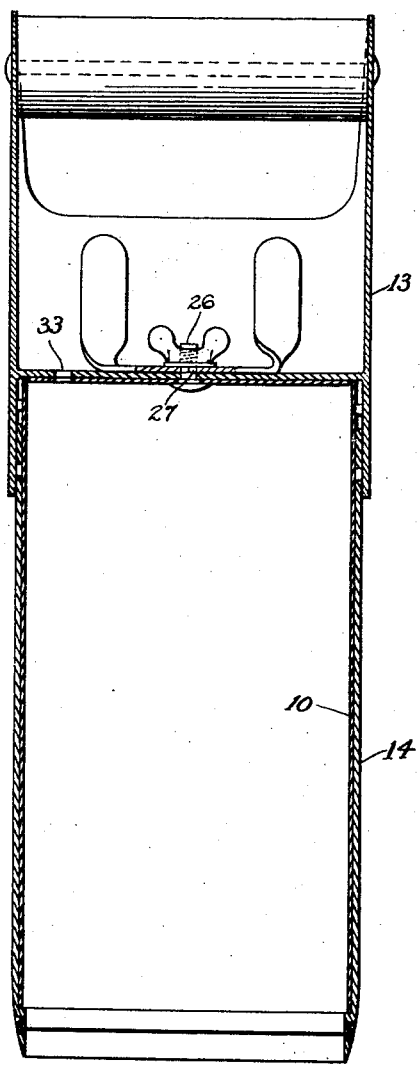
Figure 1 is a longitudinal section of the combined handle and magazine members, with the carton enclosed therein.
Figure 2:
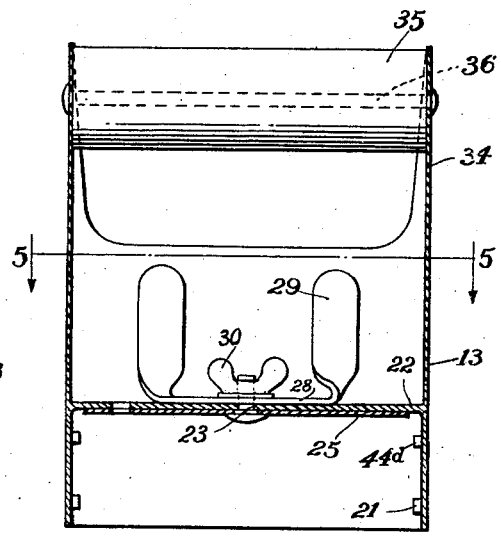
Figure 2 is a similar view of the parts detached and empty.
Figures 3, 4:
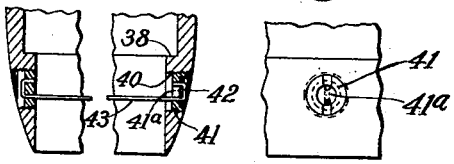
Figures 3 and 4 are sectional and face detail views of the anchoring means for the wire cutter.
Figure 11:
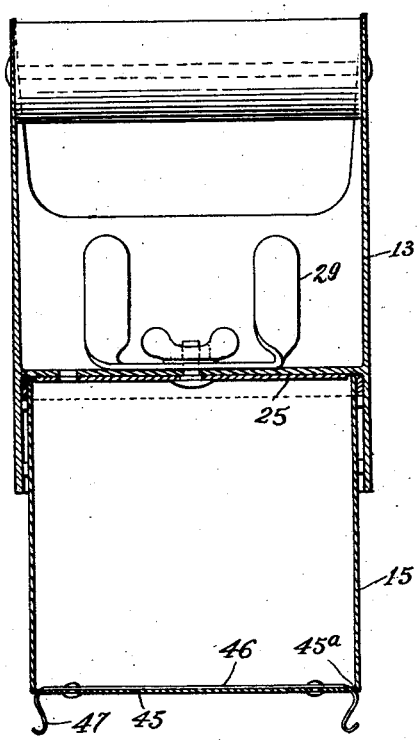
Figure 11 is a similar view of combined handle and spacing members only.
Figure 10:
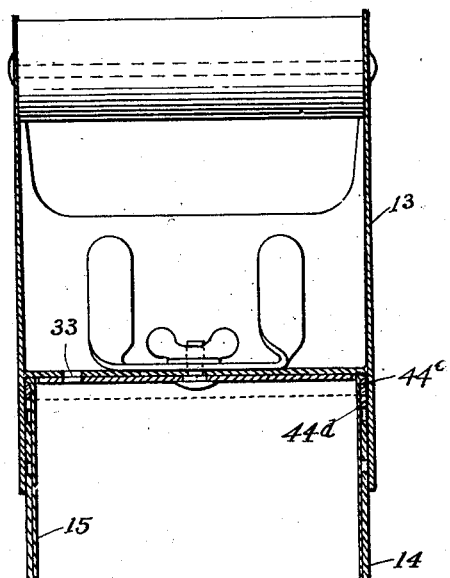
Figure 10 is a longitudinal section of combined handle, magazine and spacing members, with a short carton in position beneath the latter.

When it is desired to use a quart magazine 14 for filling a pint carton, a spacing member 15 is provided as shown in Figs. 10 to 13. This dividing member is seated within the upper end of the magazine 14 and is provided with a beaded flange 44$^a$ having one or more vertical notches 44$^c$ for receiving therein pins 44$^d$ on the handle member, a disc bottom 45 to which is secured a spring member 46 fastened on the upper face and having its ends projecting downwardly through said bottom at 45$^a$, the latter not being air-tight, and bent outwardly to form hooks 47 which extend sufficiently below the spacer to engage the inner surface of a pint carton when the latter is to be used. Fig. 10 shows the spacer and carton meeting at their edges 48 when the parts are assembled, the carton being of the open-end type. Fig. 11 shows the handle and spacing members only.

In some cases, as when less or greater amounts than a pint are to be dispensed, it will be found very desirable to form the spacer in two telescoping elements, adjustably connected together to fit the size of carton, the upper member having the notched bead and the lower the hooks, in which case, if a closed end carton is to be filled, I insert the carton within the magazine, bottom upwards, and bend the hooks 68 inwardly for engaging the exterior surface of the carton. Such modification is contemplated for closed end cartons for half pints or more than a pint, and is even preferred to the unitary construction. In Fig. 19 is shown such construction. In this view the handle member 13 is the same form as that in Figs. 1 and 2 but in place of the unitary spacing member 15, I use a compound spacer comprising an upper section 63 having a bead 44$^a$ as in the form of Fig. 13 for resting upon the pin 44$^d$, and a lower section 64 having an adjustable section connected with the upper section by means of pin 66 in the lower section entering slots 65 in the part 63, and the wing nuts 67 engaging the pin 66 to hold the sections in adjusted position. The compound spacing member will be positioned within the magazine 14 just as in the other forms. The ends of the bar 46 has downwardly projecting hooks 68 for engaging the carton 12$^a$. It will be understood that the more the spacer is extended the shorter will be the carton to be filled, and vice versa, since the magazine 14 has a constant length when used in this form. It is to be noted that I do not limit myself to the use of a spacer when cartons holding less than a quart are to be filled. With my device it is evident that I may use shorter magazines for the shorter cartons. It is however a great advantage to be able to fill different sizes of cartons with the same handle and magazine members.

In Figs. 20 and 21, is shown a modified type of handle member 17 in which structure the upper disc 48 is rotatable and is provided with a pivot member 49 which is centrally stamped out, a cover plate 81 being soldered above the opening, the edges of the opening having downwardly directed projections 50 which comprise split ends adapted to be sprung into the opening 51. The wings 29$^a$ are struck up from the metal disc 48 leaving slots 31 which engage pins 32$^a$. Vents 33 are provided as in the other form, and the bayonet joints are also used. The spacing member 15 may also be used between the handle and magazine members in this form, and may be of unitary or compound form.

Figure 16:
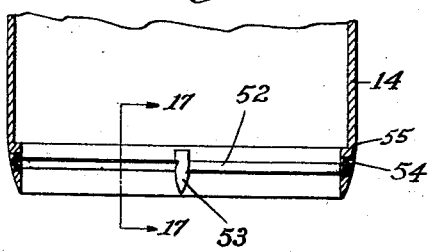
Figure 16 is a detail in vertical section of a blade type of cutter.
Figure 18:
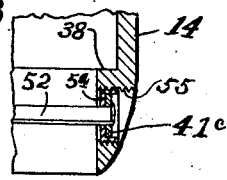
Figure 18 is a detail view in section of the anchoring means used with the blade form of cutter.
Figure 17:
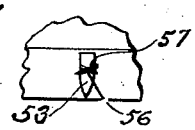
Figure 17 is a section taken on the line 17—17 of Fig. 16.

In Figs. 16, 17 and 18, I have shown a modified form of cutter which in this case is of the blade form 52, the two ends of the blade, which are half of the length thereof, are connected together by inserting them in a hollow cross piece 53 arranged in vertical position. In this form the threaded plug 54 is threaded into the openings 55 but the rotor 41$^c$ has oblique slots therein to receive the ends of the blades. The ends 57 are shown in Fig. 17 as inserted in the hollow cross plug 53 in the oblique slots 56 as stated. After assemblage, this plug 53 may be filled with Babbitt metal or solder.

The forms of cutter thus far described are secured directly to the wall of the magazine 14. I prefer, however, to use a detachable cutter for several reasons, and will now describe such form in detail. In Figs. 20, 22 and 25 to 36, the cutter is shown fixed to an annular rim member 57 which may be inserted into the end 58 of the magazine 16 from above, and has a lower edge 18 sharpened for cutting the material encountered, and a beaded upper edge 19 which has one or more vertical grooves 59 adapted to engage corresponding lugs 60 on the inner wall of the magazine near its lower edge. This lug has an upper tapered surface 61 and a lateral concave surface 62 whereby the groove 59 may be forced down into locking engagement with the lug, and the outer face of the groove sprung into the notch or concavity 62.

These rims are thus detachably engaged and locked in position in the lower end of magazine 16 with its edge 18 extending slightly below the magazine as shown in these views, but they may be readily removed from the upper end of the magazine by pressure applied to the lower face of the cutter. This enables me to make use of different types of rim cutters, and especially of rims 57 of slightly different width, or which have beads 19 having different width. This latter feature is regarded as very important, for it renders possible the use with the same magazine 16, of different rims of same width but having different width of bead 19, which latter condition permits the cutter to rest in a higher or a lower position as the bead is wider or narrower.

As the cartons used in magazines of the form designated by 16, rest upon the rim bead 19, varying the height of the latter affords accommodation for types of cartons which vary somewhat in their length, thus permitting buying cartons on the market, though they may vary somewhat in dimensions.

These detachable cutters may be of various types, though the rim member for mounting will be the same except as to the width of bead, as above explained. If either the wire or blade type is used, the ends may be secured to the flange 63 of the rim—usually by soldering or welding.

In Figs. 20, 22, 25 and 27, a wire cutter 69 is shown secured as stated above; while in Figs. 29 to 31, a blade cutter 70 is shown secured by its ends to the flange 63 as in the form in Fig. 20. In this form the blades at opposite ends of the cutter are bent downwardly in opposite directions as in fan blades, but the ends are integral. I also contemplate making the blade of this type integral with the rim, the whole being stamped out of one circular piece of metal, the bead portions then being bent outwardly over the edges, and the blades given the angle desired as shown in the drawings. In any event, I desire to slightly space the cutter blades from the lower edge of the rim as at 71 by bending the material to sink the blades below the rim. This can be done by causing the material to yield slightly endwise to provide the part 71.

In some cases, I desire to use a cutter having only a radial blade, and I have shown such construction in Figs. 32 to 34, where the blade 72 is secured to the rim at 73 at one end only. It may be so secured by welding or soldering, but preferably will be stamped from the same piece as the rim, but one end 74 will be severed from the piece and bent upwardly at 75 at right angles to the blade near the center of the same, then bent back at 76 toward the rim again, the two parts 77 and 78 being inclined in parallelism. The bead portion will then be slit at 79, and the part 80 bent inwardly to meet the end 74 and soldered to it at that point. This construction strengthens the mounting of the radial form of cutter when it is supported at one end only, the latter having some advantages over the diametrical type.

In Figs. 35 and 36 I show still another form of radial blade cutter which can be used with advantage when the material dispensed is not too hard. In this structure I use but one blade 82 secured to the rim, usually integral therewith, at 83, and is strengthened somewhat by curving the same as shown in Fig. 35, the convex surface 84 facing upward, and the lower edge being sharpened at 85 for the cutting function.

In operation, assuming that a quart carton having open ends is to be filled with a plastic material such as ice cream, for example, the magazine member 14 receives thereinto at the handle end, a quart carton with ends uncovered and its lower edge seated upon the shoulder 38. The upper edge of the said carton will then project sufficient distance above the edge of the said magazine to later permit a cover being applied without contacting the magazine. The handle member is now secured to the magazine by the bayonet joints, the vent aperture 33 is opened, by rotating valve 25 and the entire assembled device is then plunged downward into the supply can containing the material to be dispensed, to the approximate depth of the carton. The entire device is then rotated, the wings 29 moved to close the apertures 33, after which the device is withdrawn, when it will be seen that the carton has been filled with the material dispensed which we shall hereafter refer to as ice cream, and that it has been cut off from the body of the material in the larger receptacle by the cutter 43. The handle member is then removed and one of the covers 11 applied to the exposed end of the carton, the covered end is then grasped manually and the carton removed from the magazine. The other cap may then be applied completing the dispensing operation. Of course, if a carton having one closed end is to be filled, it will be inserted in an inverted position into the magazine and the filling done as with the open end cartons, except that there will be but one end to cover when filled.

In the above described operation it is assumed that both the magazine and carton are of quart size and of closed or open end type of cartons. It will be evident that pint magazines can be used by the dealer with the same handle member, when pint cartons are to be filled, or any other size of carton filled with corresponding sized magazine; but this would require several magazines which is a disadvantage and I therefore provide a structure by which the regular quart size of magazine may be used to fill any size of carton less than a quart as well as the latter and this operation will now be described. When a pint carton is to be filled with a quart magazine, the handle member is applied to the divider member 15 by engagement of pins 44$^d$ below the spacer beads 44$^a$. The upper end of the carton is now secured to the lower or closed end of the spacer by the hooks above described. These hooks will be the form designated by 47, if an open end carton is used, but hooks 68 are used if closed end cartons are to be filled. The combined carton and spacer is now inserted within the magazine from above until the carton reaches the lower end of the magazine, after which the handle is applied by the bayonet slot engagement with the handle member as before. The entire device as shown in Fig. 10 is then plunged down into the cream in the usual manner while the vent 33 is open. The vent is then closed and the combined device withdrawn. The parts 13 and 14 may then be disengaged after which the carton and divider may be removed from the magazine while the hooks 47 or 68, as the case may be, engage the carton. A cap may be applied to the lower end of the carton while the device is inverted, if the carton has open ends, then by returning the divider and carton to its former position the divider may be detached from the carton and the top cover applied as in the other case.

The operation of the compound form of spacer shown in Fig. 19 is very similar to that of the other forms, the parts being applied in the same order as in using a unitary spacer. My device combines the advantage of protecting the carton while it is being packed with its contents, of permitting insertion and removal of cartons at the upper end of the magazine and has the further advantage of permitting vent between the outside air and the interior of the magazine while the latter is filled, and still permitting the closure of the vent when it is desired to retain the contents in the carton while the latter is lifted from the large mass of material.

It is to be noted in this connection, that either of the handle members 13 or 17 are interchangeably engageable with either of the magazines 14 or 16; that either of the spacers 15 or the compound spacer shown in Fig. 19, can be used with either type of handle or either type of magazine; that either type of detachable rim cutter shown in Figs. 20, 22 and 25 to 36 may be used with magazine 16; and that any of the rim cutters herein illustrated may be provided with a wider or narrower bead for fitting magazine 16, for accommodating cartons of slightly different length.

It will thus be noted that I have made provision for a wide and varied choice of assemblage to meet widely different conditions. I contemplate manufacturing my device of metal, such as aluminum or other cast or sheet metals, but I do not desire to restrict myself to any particular material.

It is apparent that slight changes in the assemblage and arrangement of the parts, and especially of the means for handling the members 13 or 17, may be used without sacrificing the advantages of my invention, and I do not relinquish any rights to such changes as fall well within the idea of the improvement as above described and within the scope of the appended claims.

What I claim by Letters Patent is:

1. The combination with a receptacle for an ice cream carton, of a rim member detachably engaging said receptacle at one end by insertion within the other end and forcing downward to engagement adjacent the edge of the receptacle, means carried by said rim member for cutting off the ice cream filling the carton when the receptacle is rotated, and a flanged handle member detachably engaging the opposite end of the receptacle.

2. The combination with a receptacle for a carton of an annular member having secured therein a cutter adapted to fit within the receptacle with its outer edges extending slightly beyond those of the receptacle, and means providing a handle for detachably engaging the opposite end of the receptacle and closing the latter.

3. The combination of a receptacle for a carton, of a rim member having an annular sharpened edge and a transverse cutting member detachably engaging said receptacle at one end by insertion within the other end and tightly engaging the edge of the receptacle, a flanged handle member for detachably engaging the end of the receptacle opposite the cutter, an apertured closure for said handle member, means for opening and closing said aperture, and locking means for securing the handle and receptacle together.

4. The combination with a cylindrical receptacle having open ends, of a handle member having a cylindrical portion, longitudinally spaced locking pins within said portion, a transverse closure plate secured to the interior wall of said cylindrical portion above said pins, there being an aperture in said plate, and means for opening and closing said aperture.

5. The combination of a cylindrical dispensing receptacle and a handle member comprising a cylindrical portion, diametrically positioned ears integral with said cylindrical portion, a handle secured between said ears, an apertured closure secured within said cylindrical portion and having a central opening therethrough, a circular plate having a vent aperture therein, means for pivoting the plate upon the closure, for relative rotation, portions of the said plate being struck up from the middle to form engaging wings, pins fixed to said closure and extending within the slots formed by cutting out said wings to limit the rotation of said plate, and pins on the inner surface of said cylindrical portion and below said closure for engagement with said receptacle.

6. In a device of the character above described, the combination with a receptacle for receiving an ice cream carton therein while being filled, of a detachable rim member engaging said receptacle internally, and a cutter member carried by said rim member in diametrical relation thereto and slightly spaced from the edge of said rim member.

7. In a device of the character described the combination with a cylindrical receptacle having open ends, of an annular rim member having telescoping detachable engagement with the said receptacle being insertible at one end thereof, a cutter blade diametrically carried by said rim member, and means carried by the inner surface of the receptacle near the lower end for engaging said rim member and normally holding the latter in position with its outer edge extended beyond that of the receptacle.

8. The combination with a receptacle for a carton of a handle member detachably engaging one end of said receptacle, a spacing element fitting closely within the handle end of the receptacle and comprising a cylindrical body portion, a transverse closure for one end, an external annular bead at its open end, there being a notch in said bead for receiving a locking pin, and a plate extending diametrically across the inner surface of said closure, the ends of the plate extending downwardly through said closure and bent to form engaging hooks for engaging the carton therebelow.

9. A magazine-type dispensing device comprising a carton receptacle, a handle member having means for detachably engaging one end of said receptacle and a cylindrical spacing element for holding in separated relation the said handle and a carton while the latter is being filled, said spacing element comprising two cylindrical sections telescopically engaged one within the other for adjusting the effective length thereof, one said section having hooks extending therefrom for detachably engaging the said carton.

10. A magazine-type dispensing device comprising a carton receptacle having open ends, a detachable closure for one end of said receptacle and a compound spacing member for spacing the carton from said closure comprising, two cylindrical sections telescopically engaged one within the other for adjusting the effective length thereof, one of said sections having means for detachably engaging the said carton.

11. The combination with a receptacle for a carton having a cutter member at one end thereof, of a handle member detachably engaging the opposite end of the receptacle and having a cylindrical portion, a spacing member fitting closely within the upper end of the receptacle and the said cylindrical portion, and means connected with the said spacing element for engaging the upper end of the carton within the said receptacle.

12. In combination with a cylindrical receptacle for a carton and a cutting element positioned adjacent the edge of the receptacle at one end thereof and in diametrical relation thereto, a handle member having a cylindrical portion adapted for detachably engaging the opposite end, a transverse closure for said cylindrical portion having an aperture therein, valve means for opening and closing said aperture, a spacing cylindrical member having means near its open end for detachably engaging said handle member within its said cylindrical portion, the opposite end of the spacing means being closed, and means extending beyond the closed end of the spacer for engaging the outer end of a carton within said receptacle for yieldingly securing the carton and spacer together for common movement.

13. The combination with a receptacle for an ice cream carton, of a cutting element positioned adjacent the edge at one end of said receptacle and in diametrical relation thereto, a handle member having a cylindrical portion attached to engage the opposite end of the receptacle telescopically, and a transverse closing member secured within said cylindrical portion remote from the edge thereof and having an aperture therein, a cylindrical spacing element for holding in separated relation the said cylindrical portion and the upper portion of a carton, while the latter is being filled, said spacing element comprising two cylindrical sections telescopically engaged one within the other for adjusting the total length of said element, one said section thereof engaging the upper end of the carton while the other engages the said cylindrical portion of said handle member.

14. A combination with a receptacle for a carton to be filled, of a cutting element positioned at one end of said receptacle in diametrical relation thereto, a handle member having a cylindrical portion adapted to engage the opposite end of the receptacle telescopically, a transverse closing member secured within said cylindrical portion remote from the edge thereof and having an aperture therethrough, and rotatable valve means mounted upon said closure for opening and closing said aperture.

15. The combination with a cylindrical receptacle for cartons, of a detachable cutter member which fits accurately within one end of said receptacle, said cutter member comprising an annular rim having a sharp and a dull edge, an elongated cutter secured within and to said rim at diametrically opposite points, the upper or dull edge being formed with an overlapping bead, means on the inner surface of said receptacle near its lower edge for engaging the outer edge of said bead, whereby the width of said bead determines the vertical position of the said sharp edge relative to the edge of the receptacle.

In testimony whereof I hereunto affix my signature.

FREDERICK J. ROOT.